US007655863B2

(12) United States Patent
Kossak

(10) Patent No.: US 7,655,863 B2
(45) **Date of Patent: *Feb. 2, 2010**

(54) MULTI-PORT COMPRESSION CONNECTOR WITH SINGLE TAP WIRE ACCESS PORT

(75) Inventor: Robert W. Kossak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/103,766

(22) Filed: Apr. 16, 2008

(65) Prior Publication Data

US 2009/0260875 A1 Oct. 22, 2009

(51) Int. Cl.
*H02G 15/08* (2006.01)

(52) U.S. Cl. .................................................... 174/84 C

(58) Field of Classification Search ............... 174/84 C, 174/94 R; 439/98, 877
See application file for complete search history.

(56) References Cited

U.S. PATENT DOCUMENTS

| | | | |
|---|---|---|---|
| 5,036,164 A | 7/1991 | Schrader et al. | |
| 5,103,068 A | 4/1992 | Schrader | |
| 5,162,615 A | 11/1992 | Schrader et al. | |
| 5,200,576 A | 4/1993 | Schrader et al. | |
| 5,396,033 A | 3/1995 | Piriz et al. | |
| 5,552,564 A | 9/1996 | Schrader et al. | |
| 5,635,676 A | 6/1997 | Piriz | |
| 5,898,131 A | 4/1999 | Chadbourne et al. | |
| 6,452,103 B1 | 9/2002 | Piriz et al. | |
| 6,486,403 B1 | 11/2002 | Connor | |
| 6,525,270 B1 | 2/2003 | Connor et al. | |
| 6,538,204 B2 | 3/2003 | Connor | |
| 6,552,271 B2 | 4/2003 | Connor et al. | |
| 6,747,211 B2 | 6/2004 | Connor et al. | |
| 6,818,830 B2 | 11/2004 | O'Grady et al. | |
| 6,846,989 B2 | 1/2005 | Sokol et al. | |
| 7,026,552 B2 | 4/2006 | Sokol et al. | |
| 7,053,307 B2 | 5/2006 | Kossak et al. | |
| 7,121,001 B2 | 10/2006 | O'Grady et al. | |
| 7,183,489 B2 | 2/2007 | Kossak et al. | |
| 7,511,224 B1 * | 3/2009 | Kossak | 174/84 R |
| 2007/0004289 A1 | 1/2007 | Hoxha et al. | |

* cited by examiner

*Primary Examiner*—Chau N Nguyen
(74) *Attorney, Agent, or Firm*—Robert A. McCann; Christopher S. Clancy

(57) ABSTRACT

A compression connector is provided for securing wires electrically together but mechanically separated upon completion of a crimping operation applied to the compression connector. The compression connector includes a body portion having a first hook and a first ramp extending from the body portion, the first hook and first ramp forming a first opening providing an entrance to a main wire port in the body portion. The body portion further includes a second hook and a second ramp extending from the body portion, the second hook and second ramp forming a second opening defining an entrance to a common tap wire port in the body portion. A first tap wire nest is located in the body portion with the first tap wire nest having an opening in communication with the common tap wire port. A second tap wire nest is located in the body portion with the second tap wire nest having an opening on communication with the common tap wire port. In an embodiment, a third tap wire nest is located in the body portion, the third tap wire nest having an opening in communication with the common tap wire port.

20 Claims, 10 Drawing Sheets

MULTI-PORT COMPRESSION CONNECTOR WITH SINGLE TAP WIRE ACCESS PORT

BACKGROUND OF THE INVENTION

The present invention is directed to a compression connector and, more particularly, to a compression connector providing full physical separation and electrical connectivity of multiple tap wires of varying size ranges in a single, uniquely shaped common tap wire port in the compression connector.

Examples of typical multi-port compression connectors having multiple ports for receiving tap wires can be found in the following U.S. Pat. Nos. 5,036,164; 5,200,576; 6,486,403; 6,525,270; 6,846,989; 7,026,552; 7,053,307; and 7,183,489. However, none of the compression connectors disclosed in these patents has a body portion with multiple tap wire nests, where the entrance to all tap wire nests communicates with a single access opening in the compression connector body, while simultaneously maintaining the multiple tap wires physically separated from each other after the completion of a crimping operation. Furthermore, the compression connectors disclosed in the above patents are relatively difficult to manufacture compared to the present invention, due to the presence of multiple separate small wire ports in the connector body to keep the tap wires separated after crimping. The access openings in the ports of prior compression connectors must be relatively small in relation to the entire port size to ensure that the wires are secured properly upon crimping. This requirement results in serious manufacturing problems, such as extruding tools breaking during the production process.

SUMMARY OF THE INVENTION

It would be desirable to provide a multi-tap compression connector where each tap wire is physically separated from other tap wires before and after crimping yet each tap wire is placed in a separate tap wire nest accessible through a common opening in the compression connector.

It would also be desirable to provide a multiple tap wire compression connector having a single common tap wire port entrance to multiple tap wire nests, where the wires are maintained physically separated and electrically connected by a portion of the compression connector upon crimping.

It would further be desirable to provide a tap wire compression connector having a single common tap wire port entrance providing ease of access for multiple tap wires of varying sizes in a given size range.

It would also be desirable to provide a compression connector having the above advantages, and that is also relatively easy to manufacture and provides a single user with the ability to perform a crimping operation.

It would further be desirable to provide a compression connector having multiple tap wire nests of given ranges accessed through a single common tap wire port opening in the compression connector, whereby tap wires of varying size ranges may be simultaneously crimped in respective tap wire nests with sufficient force to hold each tap wire in its respective separate tap wire nest.

An easy to manufacture multi-tap compression connector for power and grounding applications is disclosed that provides crimping of more than one range of smaller sized wires, for example 6 AWG to 2 AWG, to the larger size main run wires within specific ranges, such as 2 AWG to 250 kcmils. The tap wire nests of the disclosed embodiments of the invention provide full physical separation of multiple tap wires lodged in plural tap wire nests accessible through a single common tap wire port opening. Prior to crimping, the multiple tap wire nests of the present invention do not appear as separate openings for each tap wire size range, but rather appear as branches of a larger common tap wire port. The smaller tap wire nests in the connector body of the disclosed embodiments accommodate two different ranges of tap wires, however the invention is not limited to this number of tap wire size ranges. The present invention contemplates that the disclosed compression connector may be constructed to accommodate additional tap wire ports or nests such that the multiple tap wires are fully physically separated after crimping in what began as a common wide common tap wire port prior to crimping.

A compression connector for securing a plurality of tap wires to a main line wire is disclosed. The compression connector has a body portion with a first hook and a first ramp extending from the body portion to form a first opening defining an entrance to a main wire port in the body portion. The body portion also includes a second hook and second ramp extending from the body portion, forming a second opening defining an entrance to a common tap wire port in the body portion. A first tap wire nest is disposed in the body portion, the first tap wire nest having an opening communicating with the common tap wire port. A second tap wire nest, having a different size than the first tap wire nest in the illustrated embodiment, is also disposed in the body portion. The second tap wire nest also has an opening in communication with the common tap wire port. The openings between the first and second tap wire nests are separated by an extension of the body portion of the connector that protrudes into the volume formed by the common tap wire port. This protrusion separates the first and second tap wire nests prior to crimping, and physically separates the tap wires lodged in the first and second tap wire nests subsequent to crimping. In an embodiment, a third wire tap nest is provided in the body portion, with the first, second and third tap wire nests all having an opening communicating with the entrance to the common tap wire port.

DETAILED DESCRIPTION OF THE ILLUSTRATED EMBODIMENT

Figure 10:
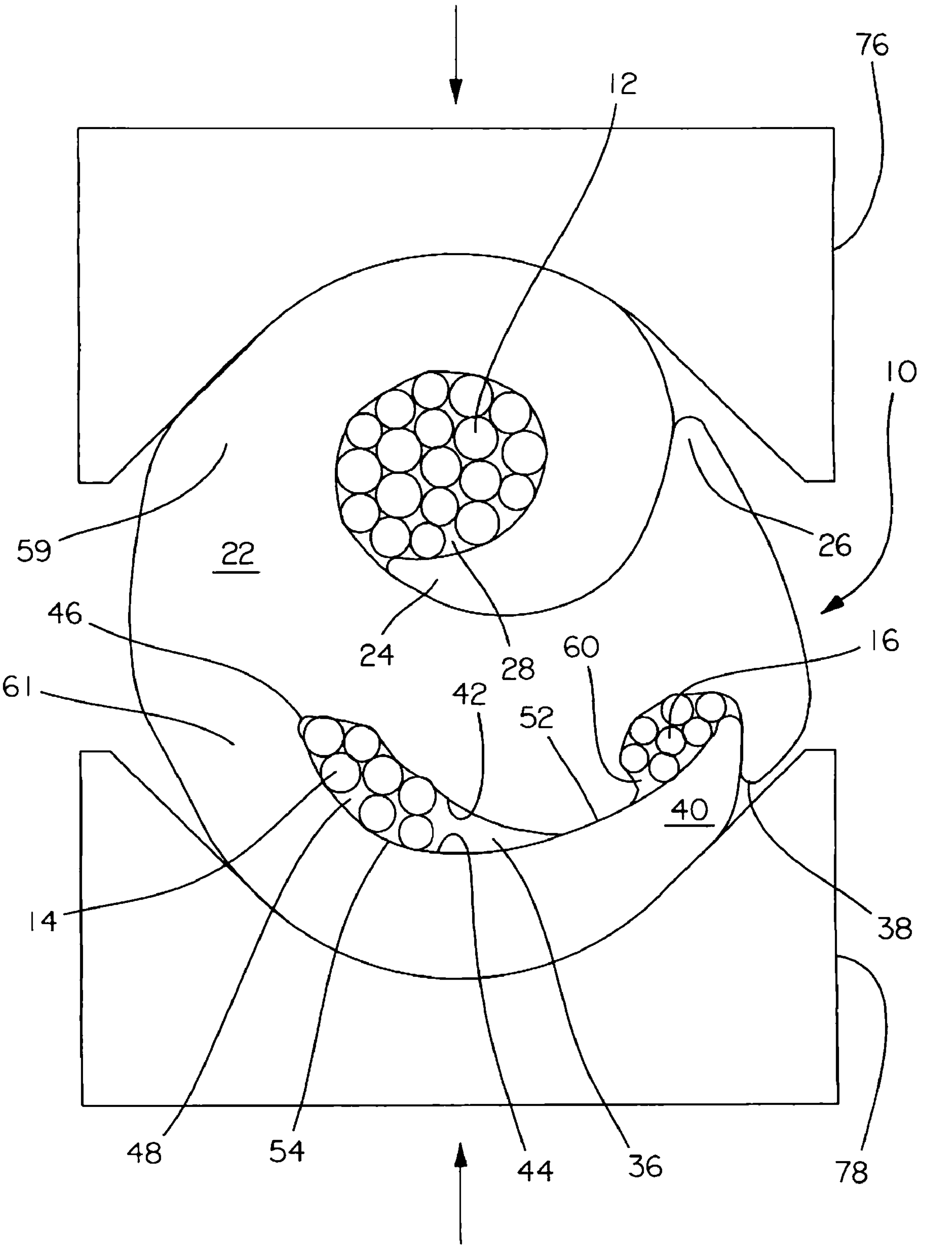
FIG. 10 is a schematic side view of the compression connector of FIG. 1 after crimping by a pair of symmetrical crimping jaws, and illustrating the connection of a smaller main line wire to two tap wires at the medium range of tap wire sizes with which the present invention is used.
Figure 11:
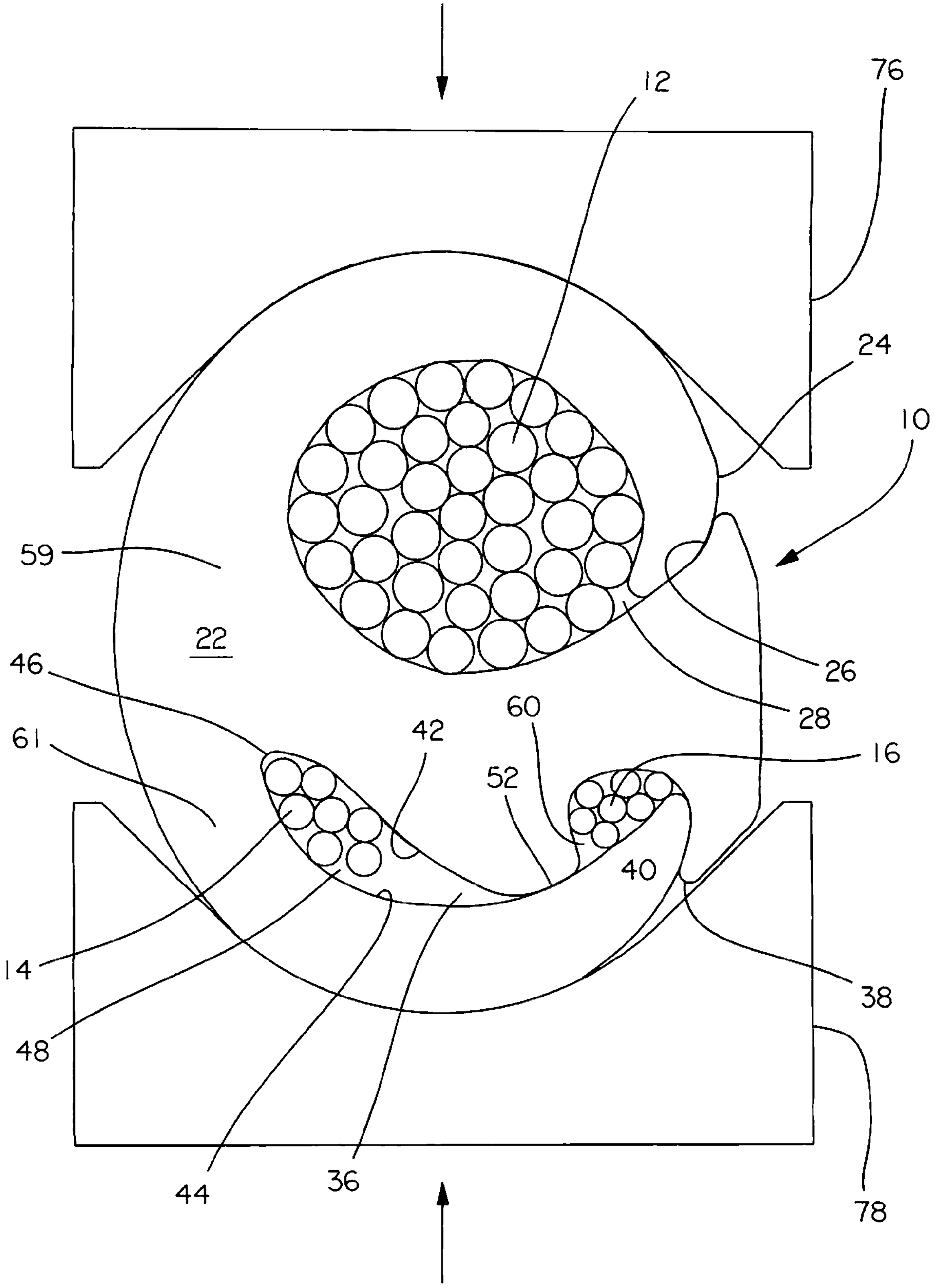
FIG. 11 is a schematic side view of the compression connector of FIG. 1 after crimping by a pair of symmetrical crimping jaws, and illustrating the connection of a larger main line wire to two tap wires of varying dimensions, the two tap wires being at the medium range of tap wires with which the present invention is used.
Figure 12:
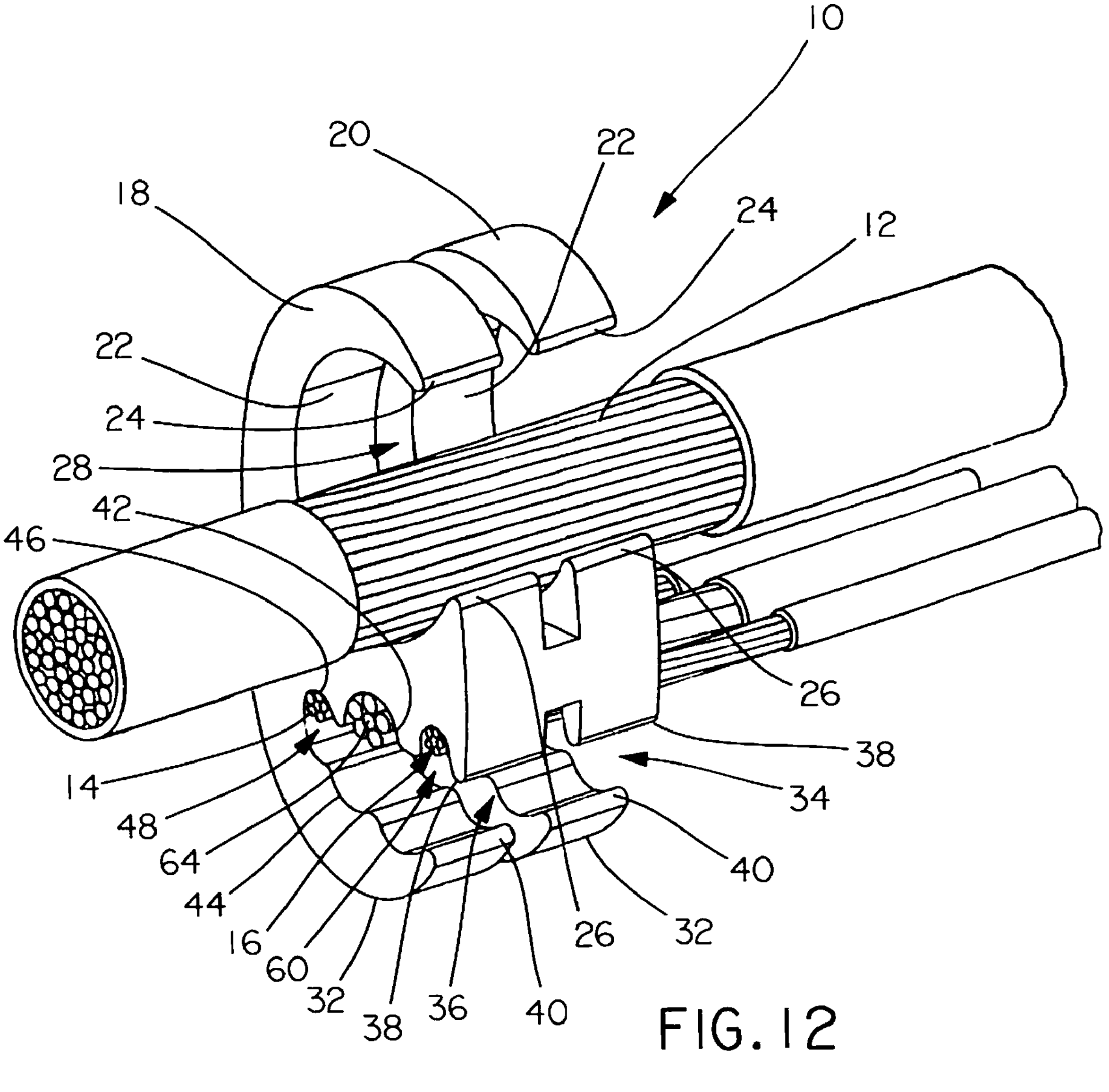
FIG. 12 is a front perspective view of a compression connector according to a second embodiment of the present invention shown in position around a main line wire and three tap wires prior to crimping.
Figure 13:
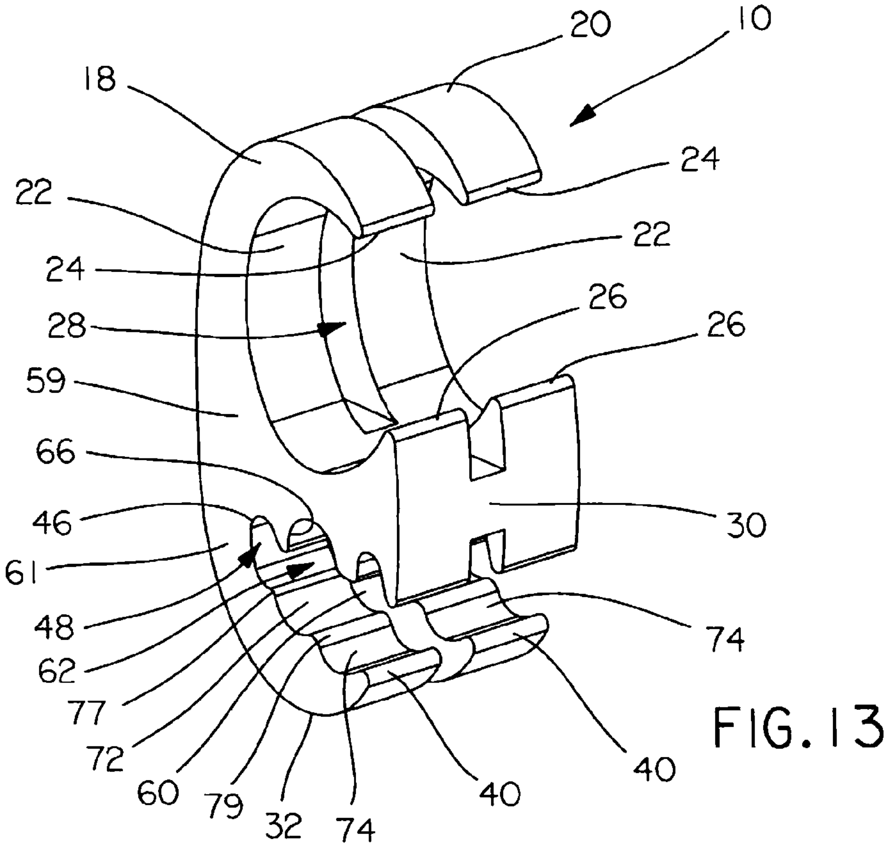
FIG. 13 is a front perspective view of the compression connector of FIG. 12, shown without the main line or tap wires and prior to crimping.
Figure 14:
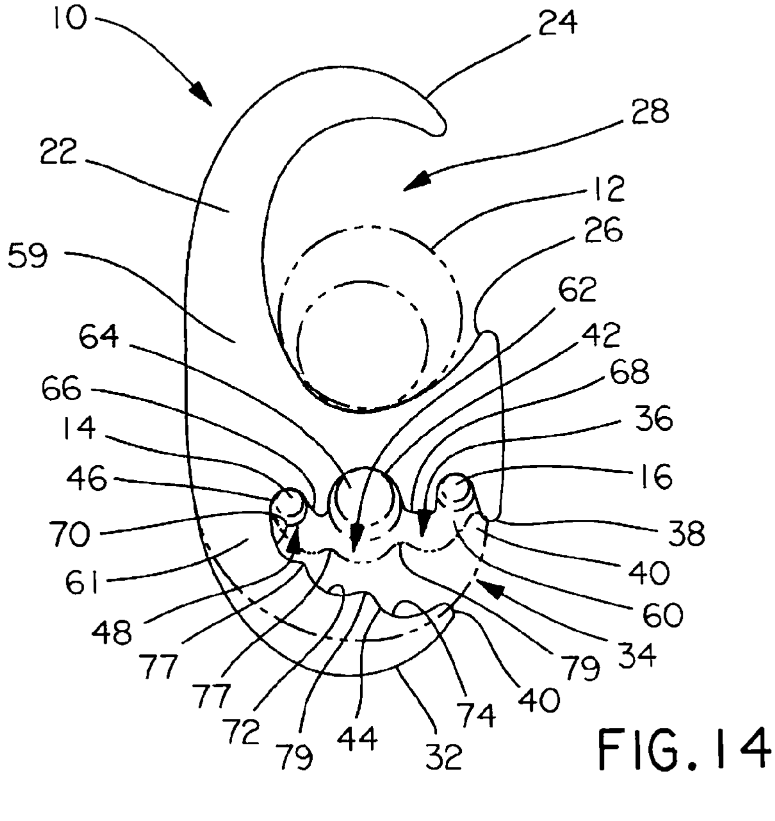
FIG. 14 is a left side view of the compression connector of FIG. 12, showing in phantom how a main line wire and three tap wires of varying size ranges would engage the appropriate ports and nests of the main wire port and the common tap wire port, with the lower hook portion of the connector shown in a partially crimped position.

The illustrated embodiments of the invention are directed to a compression connector body having a single tap wire opening communicating with a common tap wire port in an outer portion of the connector body, the common tap wire port receiving a plurality of tap wires within a range of dimensions in a plurality of different sized tap wire nests. Each tap wire nest communicates with the single opening in the common tap wire port. FIGS. 1-11 illustrate a first embodiment of the compression connector, and FIGS. 12-14 illustrate a second embodiment of the compression connector.

Figure 1:
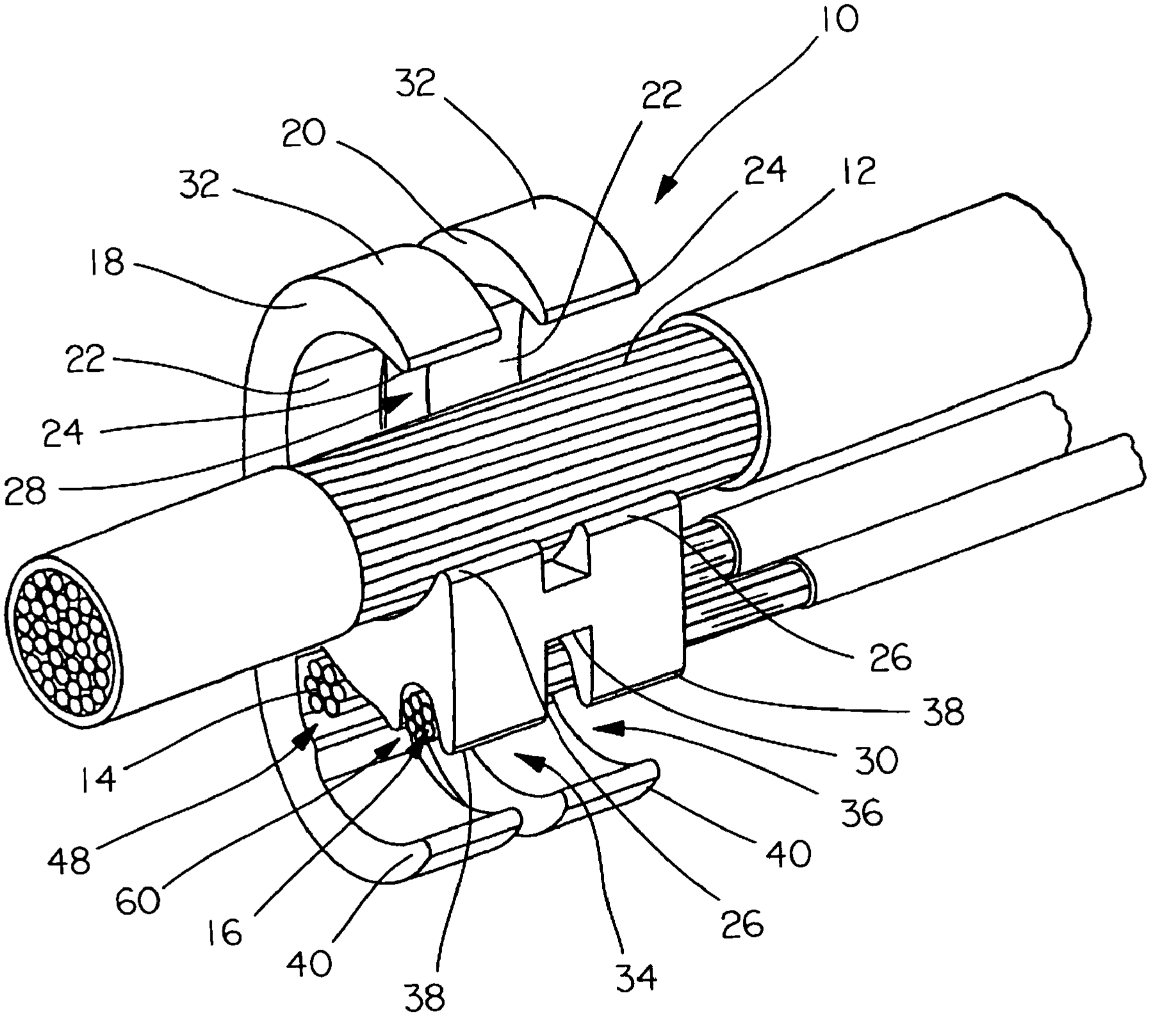
FIG. 1 is a front perspective view of a compression connector according to a first embodiment of the present invention, shown in position around a main line wire and two tap wires prior to crimping.
Figure 2:
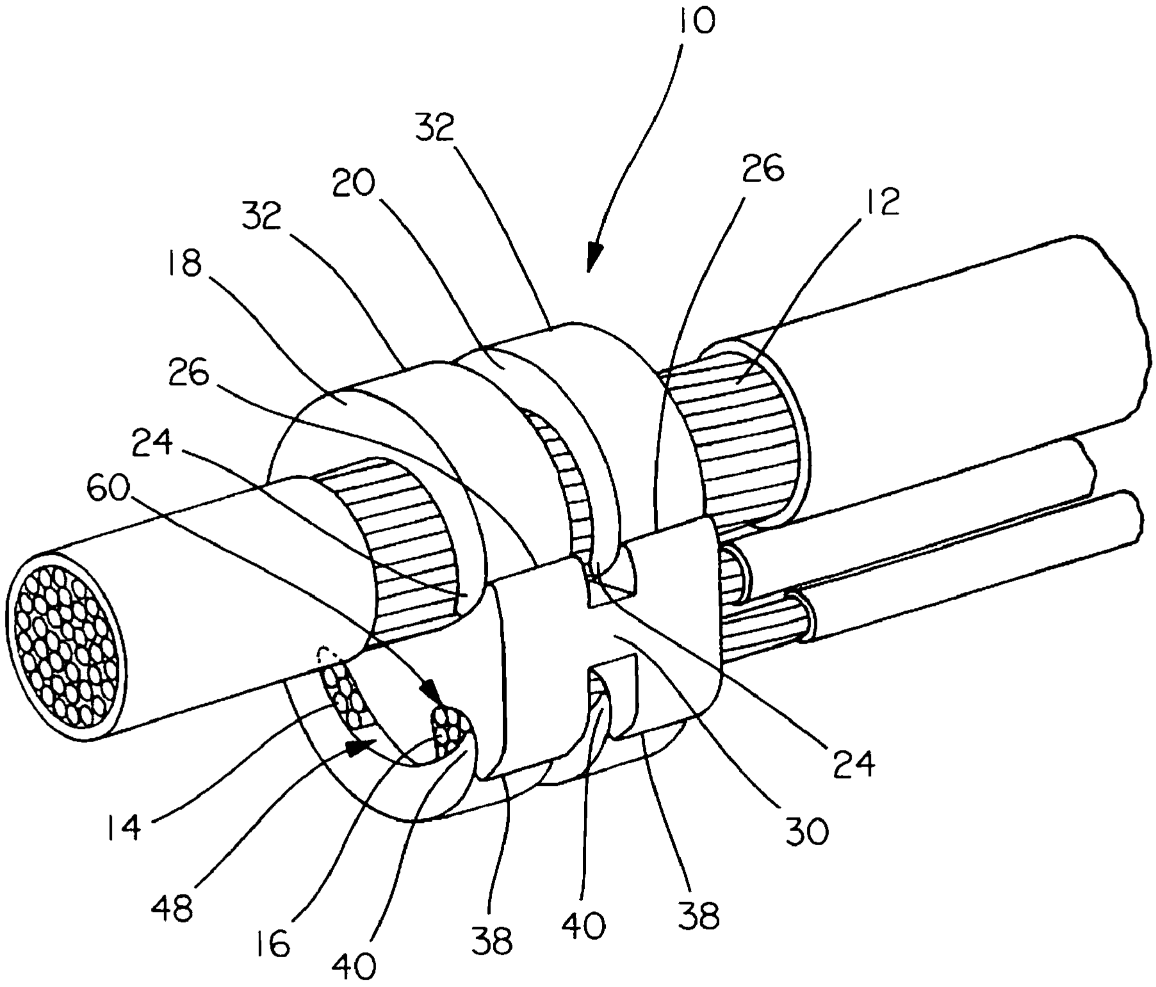
FIG. 2 is a front perspective view of the compression connector of FIG. 1 shown after being crimped around the main line wire and the two tap wires.
Figure 3:
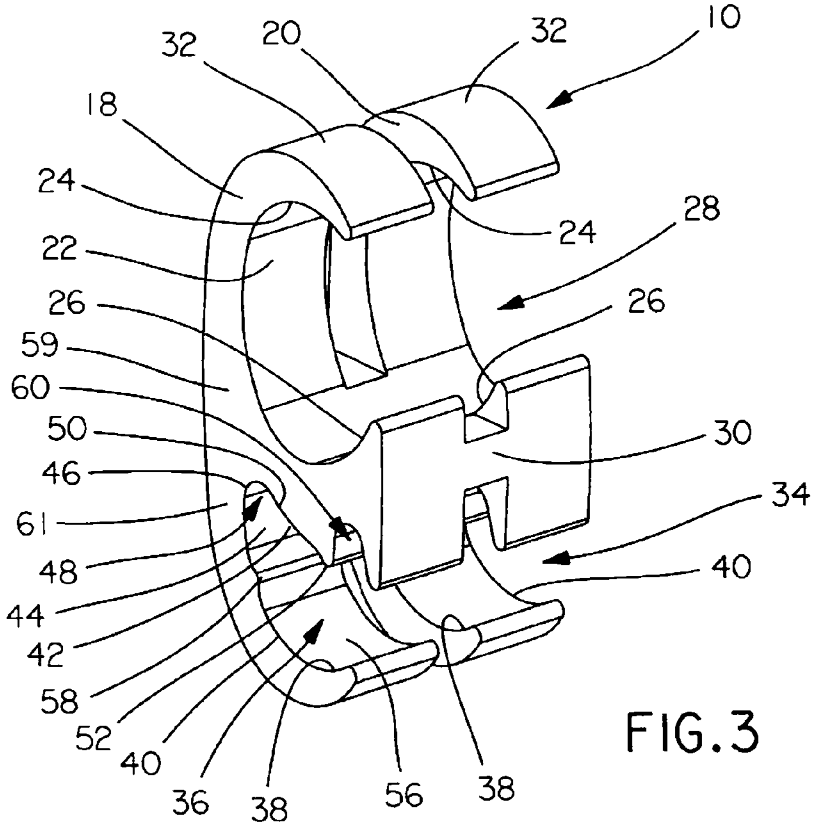
FIG. 3 is a front perspective view of the compression connector of FIG. 1.
Figure 4:
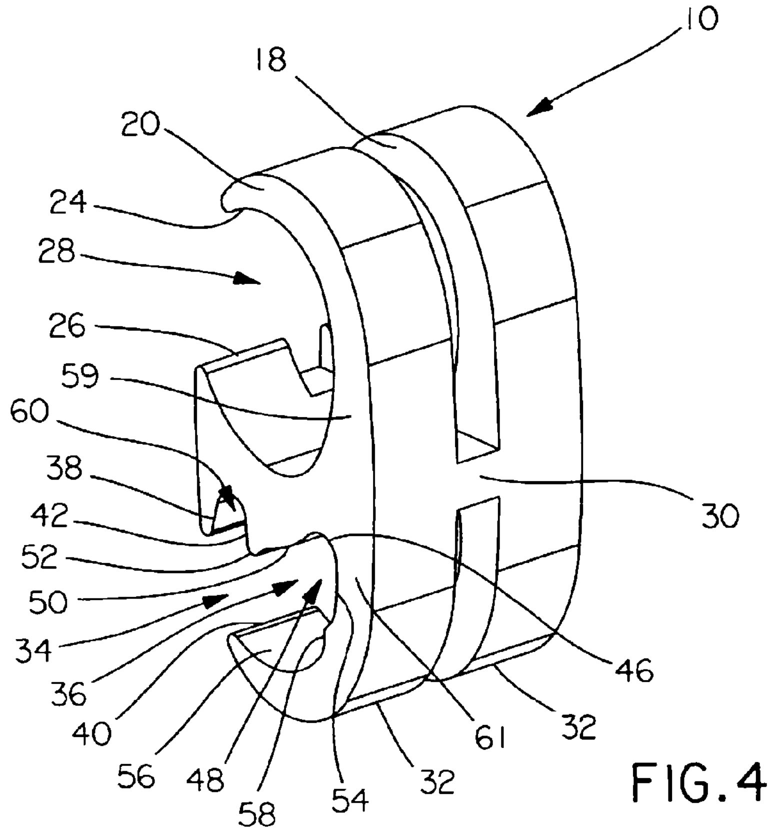
FIG. 4 is a rear perspective view of the compression connector of FIG. 1.

FIG. 1 shows a compression connector 10 prior to crimping and being secured around main line wire 12 and two tap wires 14 and 16. As illustrated, compression connector 10 is a one piece member made of electrically conductive material, such as copper. However, it is likewise contemplated that compression connector 10 may be made of any suitable electrically conductive materials or elements that will withstand a crimping operation. FIG. 2 illustrates compression connector 10 in its crimped position physically and electrically securing tap wires 14 and 16 to main line wire 12, such that tap wires 14 and 16 are physically separated from each other.

Figure 5:
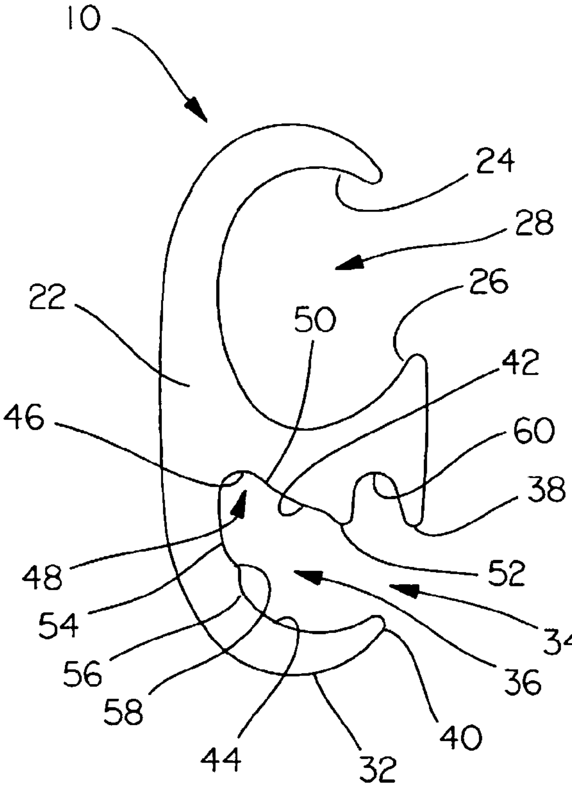
FIG. 5 is a left side view of the compression connector of FIG. 1.
Figure 6:
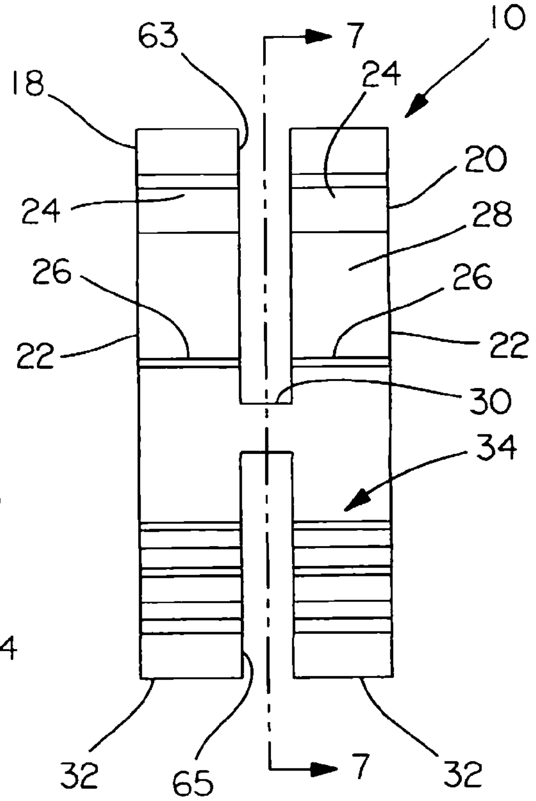
FIG. 6 is a front view of the compression connector of FIG. 1.
Figure 7:
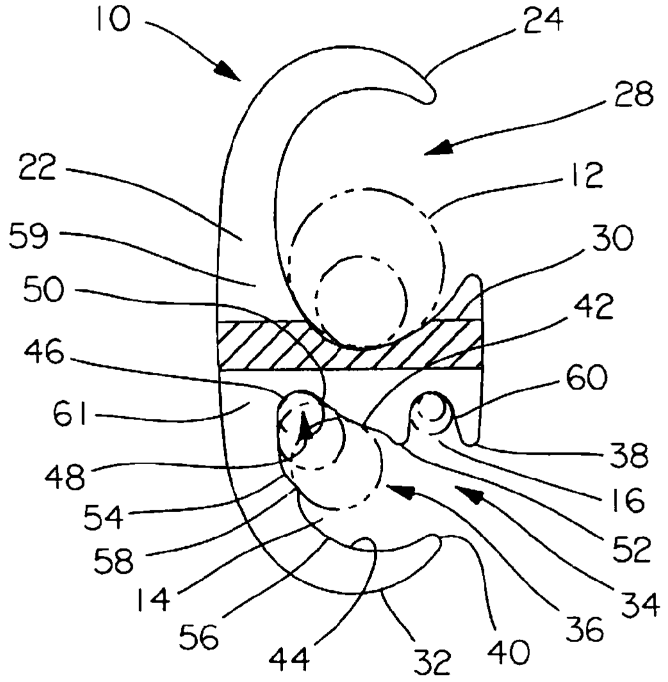
FIG. 7 is a cross-sectional view of the compression connector of FIG. 1, taken along line 7-7 of FIG. 6, and showing in phantom how a main line wire and two tap wires of different sizes would engage the appropriate ports and tap wire nests of the main wire and common tap wire ports.

As shown in FIGS. 1-7, compression connector 10 comprises a first section 18 and a second section 20. As best seen in FIG. 6, first section 18 and second section 20 are identical, and each section includes a first body portion 22 having a hook 24, and a ramp 26 extending from the hook to form a main wire port 28 in which main line wire 12 can be placed. First section 18 and second section 20 are connected by a central body portion 30, as seen in FIGS. 6 and 7. In the illustrated embodiment, hook 24 is C shaped. First section 18 and second section 20 each have a first end wall 32 forming part of body portion 22. Opening 34 in the first and second sections 18, 20 provides an entrance to a common tap wire port 36 in compression connector 10. Common tap wire port 36 is adjacent each end wall 32. Ramps 38 extend from body portion 22 to engage lower hook member 40 when compression connector 10 is crimped, as will be explained.

Common tap wire port 36 is configured to receive and accommodate tap wires 14, 16 of varying sizes, and opening 34 provides a since entrance into common tap wire port 36 through which tap wires 14, 16 of any size within a given range can be readily inserted into the common tap wire port. Referring to FIGS. 5-7, common tap wire port 36 is defined by an upper surface 42 and a lower surface 44 of body portion 22. Lower surface 44 forms part of lower hook member 40. Surfaces 42 and 44 meet at a curved junction 46 opposite common tap wire opening, 34 to form a first tap wire nest 48 to receive and accommodate a tap wire 14 of a size within a range of tap wire sizes, as will be explained. Upper surface 42 comprises a curved portion 50 that extends from curved junction 46 to a protuberance formed by rounded corner 52 that protrudes into the volume of common tap wire port 36 for purposes to be explained. Lower surface 44 includes a pair of curved surfaces 54, 56 that meet at a protuberance formed by protruding portion 58 in the illustrated embodiment. As seen in FIGS. 5 and 7, protruding portion 58 extends a short distance into the volume of common tap wire port 36. Curved surface 54 extends from, and forms part of, first tap wire nest 48, to protruding portion 58, and curved surface 56 extends from protruding portion 58 to the tip of lower hook member 40. Body portion 22 includes hinge-like, or bent wedge portions 59 and 61 to provide bending of upper hook member 24 and lower hook member 40, respectively, during crimping as will be explained. As seen in FIGS. 5 and 7, first tap wire nest 48 has a diverging configuration, extending a away from curved junction 46. In the illustrated embodiment, first tap wire nest 48 is partly defined by curved junction 46, upper and lower surfaces 42, 44 of common tap wire port 36 and protuberance 52. First tap wire nest opens into and communicates with common tap wire port 36, and is accessible through common tap wire opening 34.

In the embodiment of the invention illustrated in FIGS. 1-7, a second tap wire nest 60 is formed in upper surface 42 of body portion 22. Second tap wire nest 60 extends between rounded corner 52 and ramp 38, and receives and accommodates tap wires 16 of a size within a predetermined range of tap wire sizes. Second tap wire nest 60 also opens into and communicates with common tap wire port 36, and is accessible through common tap wire opening 34.

As seen in FIG. 7, main line wires 12 and tap wires 14 of various sizes within a range of sizes can be electrically and physically connected by compression connector 10, while maintaining the tap wires 14, 16 physically separated. Shown in phantom in FIG. 7 are two exemplary different sized main line wires 12 that can be lodged in main wire port 28. Also shown in phantom in FIG. 7 are three examples of different sized tap wires 14 that can be lodged in first tap wire nest 48. The smallest size tap wire 14 is shown lodged completely in tap wire nest 48, due to the circumference of small tap wire 14 matching, or nearly matching, the curvature of nest 48 formed at curved junction 46.

Referring again to FIG. 7, a middle sized tap wire 14 is shown lodged between curved surface 54 of lower surface 44, and curved portion 50 of upper surface 42 prior to crimping, since the middle sized tap wire 14 is too large to lodge fully against curved junction 46. Middle size tap wire 14 is advanced in common tap wire port 36 along upper surface 42 and lower surface 44 until the circumference of the tap wire 14 wedges against curved portion 50 and curved surface 54, defining the furthest distance middle size tap wire 14 can advance into nest 48 and common tap wire port 36.

FIG. 7 also illustrates, in phantom, the position of a large sized tap wire 14 lodged between a small segment of curved surface 54 of lower surface 44, curved portion 50 of upper surface 42, and protruding portion 58 of lower surface 44, prior to crimping. The large sized tap wire 14, in the position illustrated in FIG. 7, has reached its point of furthest penetration into common tap wire port 36 and nest 48 after being inserted through common tap wire opening 34.

Referring to FIGS. 6 and 7, second tap wire nest 60 is formed in upper surface 42 between rounded corner 52 and ramp 38. Second tap wire nest 60 is adapted to grip a second tap wire 16 of a size within a range of tap wire sizes upon crimping. In FIG. 7, small and large size tap wires 14 are shown in phantom inserted into second wire tap nest 60, prior to crimping. Both the smaller sized tap wire 16 and larger sized tap wire 16, as illustrated, are in contact with the bottom curved portion and sidewalls comprising second wire tap nest 60, and each tap wire has penetrated nest 60 to the maximum point of contact with nest 60. Upon completion of the crimping operation, as seen in FIGS. 8-11, rounded corner 52 of upper surface 42 provides a separation barrier between first tap wire nest 48 and second tap wire nest 60, as will be explained. Second tap wire 16 was initially inserted into common tap wire port 36 through common tap wire opening 34, wherein the common tap wire opening provides a single entrance for both tap wiles 14 and 16 to be inserted into common tap wire port 36 and into tap wire nests 48 and 60, respectively. Both tap wire nests 48 and 60 open into and communicate with common tap wire port 36.

As best seen in FIG. 6, compression connector 10 includes two slots, 62, 64 extending between the first section 18 and the second section 20. Slots 62, 64 provide a space to loop a cable tie (not shown) to secure main line wire 12 and tap wires 14, 16 to compression connector 10 before crimping, as disclosed in commonly assigned U.S. Pat. No. 6,818,830, the disclosure of which is incorporated by reference in its entirety. Although FIGS. 1-14 show compression connector 10 having slots 62, 64, it is similarly contemplated that compression connector 10 may not have any slots.

FIGS. 5 and 7 illustrate protruding portion or protuberance 58 extending upward from lower surface 44 of common tap wire port 36. However, it is within the scope of the present invention to provide a protuberance (not shown) extending downward from upper surface 42, and eliminating protuberance 58 on lower surface 44. Also, a further protuberance (not shown) can be located on lower surface 44 opposite rounded corner 52, which further protuberance would be crimped against rounded corner 52 to form the separation barrier between first tap wire nest 48 and second tap wire nest 60 upon completion of the crimping operation.

A second embodiment of the present invention is illustrated in FIGS. 12-14. This embodiment includes features that are similar to the embodiment of FIGS. 1-11, and like elements are identified with like numerals. In the embodiment of FIGS. 12-14, a third tap wire nest 62 has been added in common tap wire port 36, such that third tap wire nest 62 opens into and communicates with common tap wire port 36, and is accessible through common tap wire opening 34.

Referring to FIGS. 13 and 14, the second embodiment of the present invention has an upper surface 42 of tap wire port 36 that includes a first tap wire nest 48 and a second tap wire nest 60 configured substantially, and located in common tap wire port 36, as described with reference to the embodiment of FIGS. 1-11. In addition, a third tap wire nest 62 is formed between upper surface 42 and lower surface 44 of common tap wire port 36. In this embodiment, upper surface 42 comprises a downwardly extending protuberance 66 that partially separates nest 48 and nest 62. In like fashion, downwardly extending protuberance 68 partially separates nest 62 and nest 60. Third tap wire nest 62 comprises a cavity in upper surface 42, which cavity in the illustrated embodiment of FIGS. 12-14 is larger than the cavities formed by first tap wire nest 48 and second tap wire nest 60. Third tap wire 64 can be any size within a range of sizes that are adapted to fit into third tap wire nest 62.

The lower surface 44 of common tap wire port 36 in the illustrated embodiment of FIG. 14 comprises three curved portions 70, 72 and 74. Curved portions 70 and 72 are separated by a protuberance 77, and curved portions 72 and 74 are separated by a protuberance 79. Lower hook member 40 provides an outer end of curved portion 74. The inner end of tap wire nest 48 is formed by curved junction 46, as seen in FIGS. 13 and 14.

Referring to FIG. 14, lower hook member 40 is shown in phantom in a partially crimped position, pivoting about bent wedge portion 61. As the crimping operation proceeds, as will be explained, curved portions 70, 72 and 74 of lower surface 44 of tap wire port 36 move towards upper surface 42 of tap wire port 36 to define three distinct and physically separated tap wire nests 48, 62 and 60.

In operation, referring to the embodiment of FIGS. 1-11, C-shaped compression connector 10 allows partial hands free installation since hook 24 can be hung around and supported by main line wire 12 while tap wires 14, 16 of varying sizes are inserted through common tap wire opening 34 and into common tap wire port 36. In the illustrative embodiment of FIGS. 1-7, tap wire 14 is lodged in nest 48 against curved junction 46, and second tap wire 16 is inserted into nest 60. A mid-sized or larger sized tap wire 14 will be lodged in nest 48, as illustrated in phantom in FIG. 7.

With main line wire 12 lodged in main wire port 28 (FIG. 7), and tap wires 14, 16 lodged in their respective nests 48, 60, compression connector 10 is placed between two crimping jaws 76, 78 (FIGS. 8-11). The crimping jaws 76, 78 are part of a crimping press or machine, such as Panduit® CT-2940 Crimp Tool fitted with a pair of Panduit® CD-940H-250 Crimp Dies. The crimping press draws the crimping jaws together, and compresses compression connector 10, main line wire 12 and tap wires 14, 16 into a configuration the same as or similar to the configurations shown in FIGS. 8 to 11, depending on the size of compression connector 10, the size of main line wire 12 and the sizes of tap wires 14, 16. The outer radius of each hook member 24, 40 and of end wall 32 is smaller than the inner radius of crimping jaws 76 and 78, and thus two crimping jaw contact points are created.

As crimping jaws 76, 78 are driven together as viewed in FIGS. 8-11, the crimping forces cause compression connector body portion 22 to bend at upper and lower bent wedge portions 59, 61. Upper hook portion 24 bends inward along ramp 26, and tightly engages and compresses main line wire 12 in main line wire port 28 to form a gripping physical and electrical connection between main line wire 12 and compression connector 10.

In similar fashion, during the crimping operation, referring to FIGS. 8-11, lower hook member 40 bends inward at bent wedge portion 61 of the compression connector, and the lower hook portion advances along ramp 38. Curved surface 54 of lower surface 44 of common tap wire port 36 is moved toward curved portion 50 of upper surface 42 of the tap wire port, causing tap wire 14 to be tightly enlaced and compressed in first tap wire nest 48, forming a gripping physical and electrical connection between tap wire 14 and compression connector 10. An electrical connection is also created between tap wire 14 and main line wire 12.

Additionally, as seen in FIGS. 8-11, during the crimping operation, lower hook member 40 advances along the interior of ramp 38, and is guided by ramp 38 into second tap wire nest 60. Hook member 40 tightly engages and compresses tap wire 16 in second tap wire nest 60, forming a gripping physical and electrical connection between tap wire 16 and compression connector 10. An electrical connection is also created between main line wire 12, first tap wire 14 and second tap wile 16.

As lower hook member 40 is crimped, the lower surface 44 of common tap wire port 36 contacts rounded corner 52 of the upper surface 42, and compresses and remains in contact with rounded corner 52. As seen in each of FIGS. 8-11, the contact between rounded corner 52 and lower surface 44 creates a physical barrier between first tap wire 14 in first tap wire nest 48 and second tap wire 16 in second tap wire nest 60. Due to the electrical conductivity of the material comprising compression connector 10, an electrical connection or path between the two tap wires 14, 16 is maintained, although the two tap wires are physically separated and held in a tight grip in their respective tap wire nests.

Figure 8:
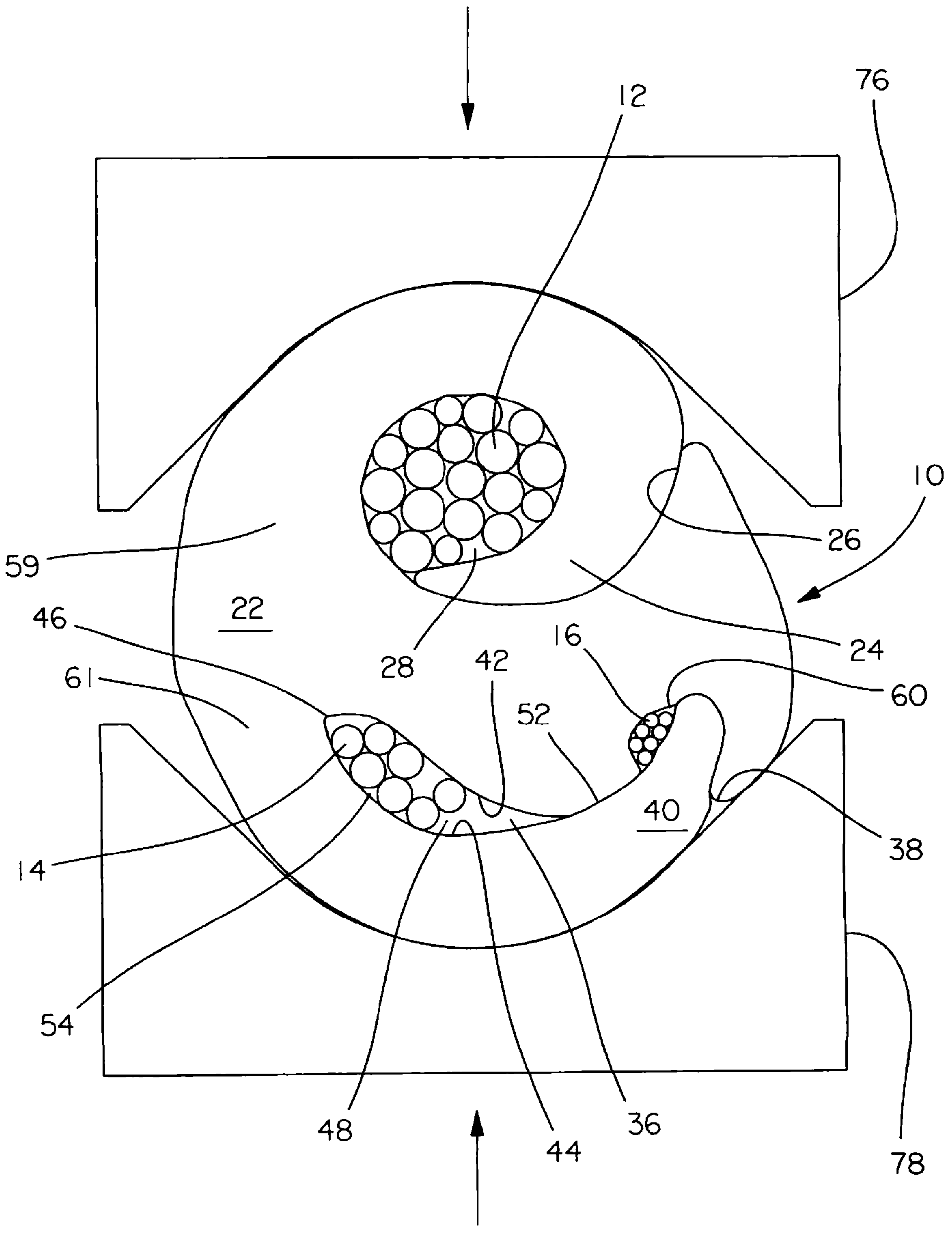
FIG. 8 is a schematic side view of the compression connector of FIG. 1 after crimping by a pair of symmetrical crimping jaws, and illustrating the connection of a smaller main line wire, a first medium sized tap wire, and a second tap wire at the smaller end of the range of tap wire sizes with which the present invention is used.
Figure 9:
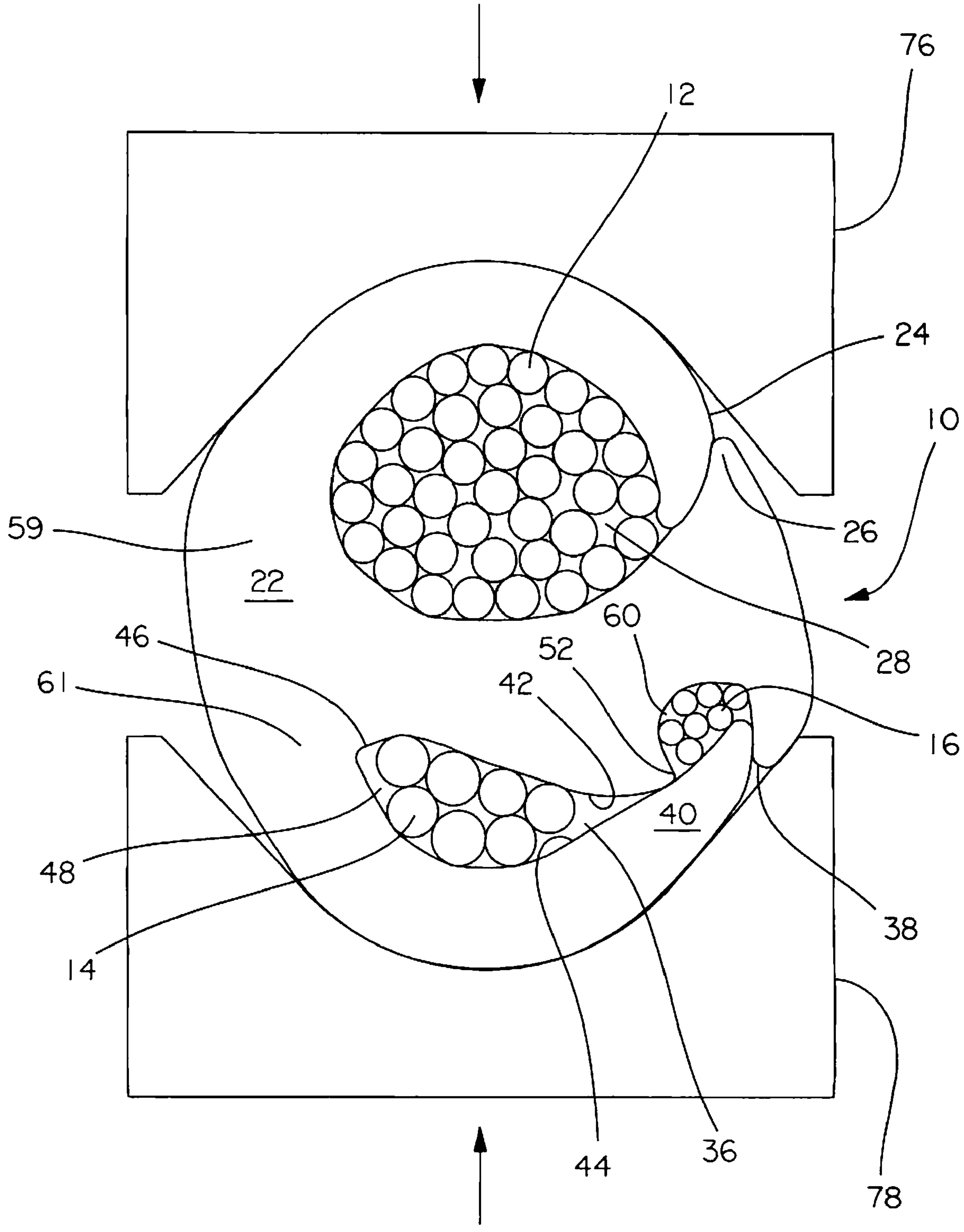
FIG. 9 is a schematic side view of the compression connector of FIG. 1 after crimping by a pair of symmetrical crimping jaws, and illustrating the connection of a larger main line wire to two tap wires at the larger end of the range of tap wire sizes with which the present invention is used.

FIG. 8 discloses the compression connector 10 in its crimped position around a middle size range main line wire 12, a medium size range first tap wire 14, and a small size range second tap wire 16. FIG. 9 discloses the compression connector 10 in its crimped position around a large size range main line wire 12, a large size range first tap wire 14, and a medium size range second tap wire 16. FIG. 10 illustrates the compression connector 10 in its crimped position around a medium size range main line wire 12, a medium size range first tap wire 14, and a large size range second tap wire 16. FIG. 11 shows the compression connector 10 in its crimped position around a large size range main line wire 12, a large size range first tap wire 14 and a large size range second tap wire 16. In each of FIGS. 8-11, the physical relation between nests 48 and 60, between lower hook 40 and rounded corner 52 of upper surface 42 of tap wire port 36, and the physical separation of tap wires 14 and 16 after crimping around wires of various size ranges is illustrated.

Referring to the operation of the embodiment of the invention disclosed in FIGS. 12-14, this C-shaped compression connector 10 also allows partial hands free installation since hook 24 can be hung around and supported by main line wire 12, while tap wires 14, 16 and 64 of varying sizes are all inserted through common tap wire opening 34 and into common tap wire port 36. In the embodiment illustrated in FIG. 14, tap wire 14 is lodged in first tap wire nest 48, tap wire 16 is lodged in second tap wire nest 60, and third tap wire 64 is lodged in third tip wire nest 62, prior to performing the crimping operation.

With main line wire 12 lodged in main wire port 28 (FIG. 12), and tap wires 14, 16, 64 lodged in their respective nests 48, 60, 62, after being inserted into common tap wire port 36 through opening 34, compression connector 10 is placed between crimping jaws 76, 78 (FIGS. 8-11) that are part of a crimping machine, such as Panduit® CT-2940 Crimp Tool fitted with a pair of crimp dies 76, 78, such as Panduit® CD-940H-250 Crimp Dies (FIGS. 8-11). The crimping jaws 76, 78 are driven together, compressing compression connector 10, main line wires 12 and tap wires 14, 16 and 64 such that upper hook portion 24 of body portion 22 bends at bent wedge portion 59 and lower hook portion 40 bends at bent wedge portion 61 (FIG. 14). Lower hook portion 24 bends inward along ramp 26, and tightly engages and compresses main line wire 12 in main line wire port 28 to form a gripping physical and electrical connection between main line wire 12 and compression connector 10.

In similar fashion, and referring to FIG. 14, during the crimping operation, lower hook member 40 bends inward at bent wedge portion 61 of the compression connector 10, with the hook 40 being captured by and advancing along the inner surface of ramp 38, as shown in phantom in FIG. 14. As lower hook member 40 is crimped, curved portion 70 of bottom surface 44 of common tap wire port 36 is advanced towards and into tight contact with tap wire 14 and compresses tap wire 14 into first tap wire nest 48. Simultaneously, protuberances 66 and 77 are crimped together and compressed, forming a barrier around first tap wire nest 48 and physically isolating tap wire 14 from third tap wire 64 in third tap wire nest 62.

As the crimping process proceeds, curved portion 72 of the bottom surface 44 contacts third tap wire 64, and tightly compresses against third tap wire 64 into third tap wire nest 62. Simultaneously, protuberance 79 contacts and tightly compresses against protuberance 68, physically isolating third tap wire 64 and third tap wire nest 62 from second tap wire port 60 and second tap wile 16. As previously described, third tap wire 64 is also physically isolated from first tap wire 14.

The crimping process also advances curved portion 74 of lower surface 44 into contact with second tap wire 16 and compresses second tap wire 16 tightly into second tap wire nest 60. Also, lower hook member 40 advances along the inner surface of ramp 38 and the tip of hook 40 engages and assists in compressing second tap wire 16 into second tap wire nest 60. Since protuberances 68 and 79 have also been compressed to form a barrier between third tap wire nest 62 and second tap wire nest 60, second tap wire 16 is physically isolated from third tap wire 64.

As a result of the above-described crimping process, tap wires 14, 16 and 62 are ultimately electrically connected to each other and to main line wire 12. The tap wires 14, 16 and 62 are also physically isolated from each other tap wire, thereby providing maximum axial holding strength retaining each tap wire in compression connector 10.

If the size of compression connector 10 permits, additional tap wire nests may be provided in common tap wire port 36, if desired, commensurate with the strength and bending capabilities of the compression connector material and configuration. In an embodiment of the present invention, compression connector 10 is composed of copper. Due to the inherent capability of copper to remain in the crimped position without any meaningful spring-back, lower surface 44 of common tap wire port 36 remains tightly engaged against all tap wires lodged in tap wire nests 48, 60 and 62, where the tap wires have initially been inserted into common tap wire port 36 through the common tap wire opening 34. Since compression connector 10 has a common tap wire opening, the strength of the compression connector is not compromised by the presence of a plurality of separate tap wire nests, each nest having a separate opening in the end wall 32 of compression connector 10.

The embodiments of the disclosed invention provide a compression connector having the ability to receive and accommodate a plurality of different sized tap wires within a specified range of wire sizes in a compression connector having a single opening communicating with a plurality of tap wire nests, with each nest formed in a common tap wire port of the compression connector. The single opening provides a compression connector that is easy to manufacture, and is stronger than compression connectors having multiple tap wire nests of varying sizes formed in the compression connector body. It should be noted that the above-described illustrated embodiments of the invention are not an exhaustive listing of the form such a compression connector in accordance with the invention might take; rather, they serve as exemplary and illustrative of embodiments of the invention as presently understood. By way of example, and without limitation, a compression connector having nests of varying configurations in the common tap wire port is contemplated to be within the scope of the invention.

The invention claimed is:

1. A compression connector for securing wires therein upon completion of a crimping operation applied to said compression connector, the compression connector comprising:

a body portion having a first hook and a first ramp both extending from said body portion, said first hook and said first ramp forming a first opening providing an entrance to a main wire port in said body portion;

the body portion further having a second hook and a second ramp both extending from said body portion, said second hook and said second ramp forming a second opening defining an entrance to a common tap wire port in said body portion;

a first tap wire nest in said body portion, said first tap wire nest having an opening in communication with said common tap wire port; and a second tap wire nest in said body portion, said second tap wire nest having an opening in communication with said common tap wire port.

2. The compression connector of claim 1, wherein said common tap wire port includes an upper surface and a lower surface in said body portion, said lower surface spaced from said upper surface, a protuberance extending from one of said upper and lower surfaces, said protuberance contacting the other of said upper and lower surfaces and physically separating said first tap wire nest and said second tap wire nest upon completion of said crimping operation.

3. The compression connector of claim 2, wherein said protuberance extends from said upper surface of said common tap wire port, said second protuberance contacting said lower surface of said common tap wire port upon completion of said crimping operation.

4. The compression connector of claim 1, wherein said first tap wire nest is partly defined by a curved junction formed at a connection between an upper surface and a lower surface of said common tap wire port in said body portion.

5. The compression connector of claim 4, wherein said first tap wire nest is also partly defined by said curved junction, said upper and lower surfaces of said common tap wire port, and a protuberance extending from said upper surface of said common tap wire port.

6. The compression connector of claim 5, wherein said first tap wire nest has a diverging configuration extending away from said curved junction, said first tap wire nest adapted to receive tap wires of varying sizes within a range of sizes upon insertion of said tap wires through said entrance to said main wire port in said body portion.

7. The compression connector of claim 2, wherein said second tap wire nest partly defined in said upper surface of said common tap wire port by said protuberance extending from said upper surface.

8. The compression connector of claim 7, wherein said second tap wire nest is also partly defined by said second ramp.

9. The compression connector of claim 8, wherein said second ramp and said protuberance form opposing side walls of said second tap wire nest.

10. The compression connector of claim 1, wherein said second hook extends into said second tap wire nest upon completion of said crimping operation, said second hook adapted to tightly engage said second tap wire in said second tap wire nest upon completion of said crimping operation.

11. The compression connector of claim 1, further including a third tap wire nest in said body portion;

said third tap wire nest having an opening in communication with said common tap wire port.

12. The compression connector of claim 11, wherein:

said common tap wire port includes an upper surface and a lower surface of said body portion, said lower surface spaced from said upper surface;

a first protuberance extending from one of said upper and lower surfaces, said first protuberance contacting the other of said upper and lower surfaces and physically separating two of said tap wire nests upon completion of said crimping operation.

13. The compression connector of claim 12, including:

a second protuberance extending from one of said upper and lower surfaces, said second protuberance contacting the other of said upper and lower surfaces and physically separating two of said tap wire nests upon completion of said crimping operation.

14. The compression connector of claim 13, wherein:

both of said first and second protuberances extend from said upper surface of said common tap wire port, said first and second protuberances contacting said lower surface of said common tap wire port upon completion of said crimping operation.

15. The compression connector of claim 13, wherein:

said first tap wire nest is located between said first protuberance and a curved junction formed at a connection between said upper surface and said lower surface.

16. The compression connector of claim 13, wherein:

said second tap wire nest is located between said second protuberance and said second ramp.

17. The compression connector of claim 13, wherein:

said third tap nest is located between said first and second protuberances.

18. The compression connector of claim 13, wherein:

said lower surface of said common tap wire port includes a third protuberance extending from said lower surface, said third protuberance contacting said first protuberance and closing said first tap wire nest upon completion of said crimping operation.

19. The compression connector of claim 8, wherein said lower surface of said common tap wire port includes a fourth protuberance contacting said second protuberance and closing said third tap wire nest upon completion of said crimping operation.

20. The compression connector of claim 19, wherein:

said second hook is inserted into said second tap wire nest and adjacent said second ramp to close said second tap wire nest upon completion of said crimping operation.

* * * * *